(12) United States Patent
Murakami

(10) Patent No.: US 8,149,304 B2
(45) Date of Patent: Apr. 3, 2012

(54) SOLID-STATE IMAGING DEVICE AND IMAGING DEVICE

(75) Inventor: Masashi Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 12/571,838

(22) Filed: Oct. 1, 2009

(65) Prior Publication Data

US 2010/0091160 A1 Apr. 15, 2010

(30) Foreign Application Priority Data

Oct. 10, 2008 (JP) .................................. 2008-263859

(51) Int. Cl.
*H04N 9/64* (2006.01)
*H04N 5/217* (2011.01)
*H04N 3/14* (2006.01)
*H01L 27/00* (2006.01)

(52) U.S. Cl. ........ 348/245; 348/246; 348/241; 348/308; 348/247; 250/208.1

(58) Field of Classification Search .................. 348/245, 348/241, 243, 246, 247, 308, 248, 301, 193, 348/687, 673, 500; 250/208.1, 214 R, 214.1; 257/59, 292, E21.434, E21.444
See application file for complete search history.

(56) References Cited

U.S. PATENT DOCUMENTS

| 2004/0233310 | A1* | 11/2004 | Egawa et al. ................. 348/301 |
| 2006/0170794 | A1* | 8/2006 | Higuchi et al. ............... 348/241 |
| 2006/0203112 | A1* | 9/2006 | Aoki ............................. 348/294 |
| 2006/0256220 | A1 | 11/2006 | Rysinski et al. |

FOREIGN PATENT DOCUMENTS

JP 2008-124527 5/2008

* cited by examiner

*Primary Examiner* — Lin Ye
*Assistant Examiner* — Marly Camargo
(74) *Attorney, Agent, or Firm* — McDermott Will & Emery LLP

(57) ABSTRACT

Solid-state imaging device having a plurality of vertical signal lines, includes for each vertical signal line, an effective pixel and a dummy pixel, a switch transistor provided on a path connecting the dummy pixel and the vertical signal line, and a read-out unit. The switch transistor is OFF while a first signal is outputted from the effective pixel and ON while a second signal is outputted from the dummy pixel. The read-out unit (i) reads out a level of the first signal while the switch transistor is OFF, and (ii) reads out a difference between the level of the first signal and a level of the second signal when the switch transistor is turned from OFF to ON.

11 Claims, 11 Drawing Sheets

SOLID-STATE IMAGING DEVICE AND IMAGING DEVICE

This application is based on the disclosure of Japanese Patent Application No. 2008-263859 filed on Oct. 10, 2008, including specification, drawings, and claims is incorporated herein by reference in its entirety.

BACKGROUND OF THE INVENTION (1) Field of the Invention

The present invention relates to a solid-state imaging device and an imaging device, particularly to a MOS type solid-state imaging device, such as a CMOS (Complementary Metal Oxide Semiconductor) image sensor.

(2) Description of the Related Art

When extremely strong light, such as sunlight, is incident on a CMOS image sensor, an output signal thereof is radically lowered so that a portion corresponding to the lowered signal appears dark. Such a problem occurred in a CMOS image sensor is called a black-crush phenomenon. To suppress this phenomenon, the following method is proposed. An amplifier (amp) that does not have a photodiode (hereinafter, referred to as pixel dummy amplification transistor) is formed within a pixel and a unit for detecting that a reset level outputted from a pixel shows an abnormal value indicating that massive light amount is incident is provided. When it is detected that the massive light amount is incident, the reset level is replaced by an output level of the pixel dummy amplification transistor (See Japanese Unexamined Patent Application Publication No. 2008-124527).

FIG. 1 is a schematic block diagram showing a conventional solid-state imaging device (CMOS image sensor).

The conventional CMOS image sensor has a pixel area 100 where a plurality of pixels are two-dimensionally arranged, a vertical scanning circuit 110 for selecting pixels, a correction unit 120 that is an integration of a black-crush correction unit and a longitudinal line correction unit, a pixel signal reading circuit 130, a horizontal scanning circuit 140, an analog front end (AFE) 150, an A/D convertor (ADC) 160, and an output processing unit 170, and a timing control unit 180.

With this configuration, each pixel in the pixel area 100 is provided with a photodiode 101 for performing photoelectric conversion and pixel transistors, such as a transfer transistor 102, an amplification transistor 103, a reset transistor 104, and a selection transistor 105.

In addition, the vertical scanning circuit 110 performs control so as to (i) supply a transfer pulse (TRG), a selection pulse (SEL), a reset pulse (RSE) and the like to each pixel transistor, (ii) convert signal electric charge obtained by the photodiode 101 to a pixel signal (SIG) and (iii) output the pixel signal (SIG) to the vertical signal line 190. Note that the vertical signal line 190 is provided at each pixel column, and is connected to each current source circuit 191, and an output terminal thereof is connected to the pixel signal reading circuit 130.

In addition, the correction unit 120 is provided, for each line of pixels, with a pixel dummy amplification transistor 121, a pixel dummy selection transistor 122, and a bias circuit 123 for applying a bias voltage to each pixel dummy amplification transistor 121. The correction unit 120 performs longitudinal line correction and black-crush correction. Note that the pixel dummy amplification transistor 121 and the pixel dummy selection transistor 122 are collectively referred to as a pixel dummy or a pixel dummy transistor.

In addition, the pixel signal reading circuit 130 (i) retains pixel signals of one line outputted from the vertical scanning circuit 110, (ii) sequentially transfers the pixel signals of the one line in the horizontal direction by control by the horizontal scanning circuit 140, and (iii) outputs the pixel signals to the analog front end (AFE) 150.

FIGS. 2 and 3 show a horizontal period timing for correcting longitudinal noises with regard to a gain.

First, after the pixel dummy selection transistor 122 selects a pixel dummy row, a reset signal (RST) is inputted, and a non-signal period begins. At this time, a bias set value (approximately $V_{DD}$) in the non-signal period is inputted to the gate of the pixel dummy amplification transistor 121.

Subsequently, when a transfer gate is switched ON, a signal read-out period begins. At this time, a bias set value in bright time to be corrected is inputted to the gate of the pixel dummy amplification transistor 121.

FIG. 2 shows a horizontal period timing for black-crush correction in an effective period in accordance with a conventional embodiment. Since clamp operation is performed exclusively in the non-signal period, a level of a voltage drop amount (approximately Vth) by the clamp level+source follower in the pixel signal SIG is applied to the gate level of the pixel dummy amplification transistor 121. Since the voltage drop amount is Vth caused by the substrate bias of the pixel dummy amplification transistor 121, the voltage drop amount is set to be approximately Vth level. In addition, as shown in FIG. 2, in the signal read-out period, in order to turn OFF this black-crush correction unit, a level (e.g. GND level) that turns OFF the transistor that is the gate level of the pixel dummy amplification transistor 121 is applied.

When massive light, such as sunlight, is incident, the SIG level shows a voltage drop as shown by the dash line. However, the black-crush correction unit clamps the SIG level in the non-signal period. Thus, the black-crush phenomenon can be prevented.

An image sensor disclosed by the Japanese Unexamined Patent Application Publication No. 2008-124527 enables effective longitudinal line correction and the sun blackening correction (black-crush correction unit) so that a high-quality, small-size, and low-cost camera device can be achieved and that a high-quality imaging device can be provided.

However, the configuration according to the conventional technique has the following problem. The black-crush correction unit provided at each pixel column may cause fixed noises (so-called longitudinal noises) different according to each pixel column.

SUMMARY OF THE INVENTION

The object of the present invention is therefore to provide a solid-state imaging device and an imaging device each of which performs the black-crush correction and reduces the longitudinal noises.

The solid-state imaging device according to the present invention has a plurality of vertical signal lines. The solid-state imaging device includes, for each vertical signal line: an effective pixel having a photoelectric converter, a transfer transistor, a reset transistor, and a first amplification transistor, the first amplification transistor being connected to (i) the photoelectric converter via the transfer transistor and a power supply via the reset transistor at a gate thereof, (ii) the power supply at a drain thereof, and (iii) the vertical signal line at a source thereof; a dummy pixel having a second amplification transistor being connected to (i) a bias circuit outputting a bias voltage for judging occurrence of a black-crush phenomenon at a gate thereof, (ii) the power supply at a drain thereof, and (iii) the vertical signal line at a source thereof; a switch transistor operable to be OFF while a first signal is outputted from the effective pixel and ON while a second signal is outputted from the dummy pixel, the first signal being outputted according to the level of the gate of the first amplification transistor, the second signal being outputted according to the level of the gate of the second amplification transistor, the switch transistor being provided on a path connecting the source of the second amplification transistor and the vertical signal line; and a read-out unit operable to (i) read out a level of the first signal while the switch transistor is OFF, and (ii) read out a difference between the level of the first signal and a level of the second signal when the switch transistor is turned from OFF to ON.

The imaging device according to the present invention includes: a solid-state imaging device operable to image a subject; an optical system operable to form an image in a pixel area of the solid-state imaging device; a drive control unit operable to drive the optical system; a signal processing unit operable to perform signal processing on a signal outputted from the solid-state imaging device and generate video data; a recording unit operable to record therein the video data; an output unit operable to output the video data; and an operation unit operable to input various types of input signals for controlling imaging operation, wherein the solid-state imaging device has a plurality of vertical signal lines. The solid-state imaging device includes, for each vertical signal line: an effective pixel having a photoelectric converter, a transfer transistor, a reset transistor, and a first amplification transistor, the first amplification transistor being connected to (i) the photoelectric converter via the transfer transistor and a power supply via the reset transistor at a gate thereof, (ii) the power supply at a drain thereof, and (iii) the vertical signal line at a source thereof; a dummy pixel having a second amplification transistor being connected to (i) a bias circuit outputting a bias voltage for judging occurrence of a black-crush phenomenon at a gate thereof, (ii) the power supply at a drain thereof, and (iii) the vertical signal line at a source thereof; a switch transistor operable to be OFF while a first signal is outputted from the effective pixel and ON while a second signal is outputted from the dummy pixel, the first signal being outputted according to the level of the gate of the first amplification transistor, the second signal being outputted according to the level of the gate of the second amplification transistor, the switch transistor being provided on a path connecting the source of the second amplification transistor and the vertical signal line; and a read-out unit operable to (i) readout a level of the first signal while the switch transistor is OFF, and (ii) read out a difference between the level of the first signal and a level of the second signal when the switch transistor is turned from OFF to ON.

With the above configuration, the level of the first signal is readout as a pixel signal in accordance with a level of incident light, and the difference between the level of the first signal and the level of the second signal is read out as a black crush judgment signal for judging occurrence of a black-crush phenomenon, which enables detection of the occurrence of a black-crush phenomenon. With the above configuration, longitudinal noises caused by variations in the characteristics of the transistors included in the black-crush correction unit can be reduced, which is a problem the solid-state imaging device of the conventional technique has not addressed. Accordingly, the image quality can be improved. Furthermore, by reducing longitudinal noises, it is unnecessary to additionally provide a longitudinal line correction circuit. Thus, low power consumption can be achieved by downsizing the area of the device and reducing the circuits.

At a first time point while the switch transistor is OFF, the reset transistor is temporarily ON, and at a subsequent second time point while the switch transistor is OFF, the transfer transistor is temporarily ON, the read-out unit reads out the level of the first signal by sampling (i) an output level of the effective pixel from the first time point to the second time point and (ii) an output level of the effective pixel from the second time point on, and the read-out unit reads out the difference by sampling (i) an output level of the effective pixel while the switch transistor is OFF, and (ii) an output level of the dummy pixel while the switch transistor is ON.

With the above configuration, by sequentially reading out the pixel signal and the black-crush judgment signal, the black-crush judgment can be performed without causing a potential difference of the vertical signal line between in the non-signal period and in the signal read-out period, which is a problem with regard to the conventional technique. As a result, the occurrence of longitudinal noises caused by the potential variations in the vertical signal line can be suppressed.

The read-out unit includes: an inverting amplifier circuit connected to the vertical signal line via a clamp capacitor; and a switch element connected in series with a feedback capacitor in a feedback path of the inverting amplifier circuit, and the switch element is ON while the level of the first signal is read out, and OFF while the difference is read out.

With the above configuration, the read-out unit fulfills a function of amplifying a level of the pixel signal with the use of a gain defined by the clamp capacitor and the feedback capacitor when reading out the pixel signal outputted from the effective pixel. In addition, when the black-crush judgment signal is read out, the feedback capacitor is electrically separated so that a gain of the read-out unit is maximized. Thus, it can be accurately judged whether the black-crush phenomenon occurs.

The solid-state imaging device further includes, for each vertical signal line: a switch element provided on the vertical signal line between a node connected to the dummy pixel via the switch transistor and a node connected to the effective pixel. When the switch element is turned OFF during the black-crush judging period for judging occurrence of a black-crush phenomenon, a load capacity of each vertical signal line can be electrically cut. Thus, the black-crush judgment can be performed in a short period of time.

The first amplification transistor is identical in type with the second amplification transistor. With this configuration, since the effective pixel and the dummy pixel have the same the output characteristic, the detection accuracy of a difference between the first signal outputted from the effective pixel and the second signal outputted, from the dummy pixel can be easily enhanced.

The effective pixel further includes a first selection transistor provided on a path connecting the source of the first amplification transistor and the vertical signal line, the dummy pixel further includes a second selection transistor provided on a path connecting the source of the second amplification transistor and the vertical signal line, and the first selection transistor is identical in type with the second selection transistor. With this configuration, since the effective pixel and the dummy pixel have the same the output characteristic, the detection accuracy of a difference between the first signal outputted from the effective pixel and the second signal outputted from the dummy pixel can be easily enhanced.

The dummy pixel further includes at least one third amplification transistor connected in parallel to the second amplification transistor. With this configuration, if the effective pixel employs a circuit configuration without selection transistor, the detection accuracy of a difference between the first signal outputted from the effective pixel and the second signal outputted from the dummy pixel can be easily enhanced.

The solid-state imaging device further includes, for each vertical signal line: a signal retention capacitor retaining therein the level of the first signal read out by the read-out unit while the switch transistor is OFF; and a replacement circuit operable to replace the level of the first signal retained in the signal retention capacitor with a prescribed level when the difference shows occurrence of the black-crush phenomenon. With this configuration, a signal of a predetermined level is outputted when the black-crush phenomenon occurs. Thus, it can be notified to the subsequent signal processing circuit whether the black-crush phenomenon occurs.

The solid-state imaging device further includes, for each vertical signal line: a signal retention capacitor retaining therein the level of the first signal read out by the read-out unit while the switch transistor is OFF; an AD converter circuit operable to perform analog to digital conversion to the level of the first signal retained in the signal retention capacitor; a memory retaining therein digital information obtained by the AD converter circuit; and a replacement circuit operable to replace the digital information with a prescribed value when the difference shows occurrence of the black-crush phenomenon. With this configuration, digital information having a predetermined value is outputted when the black-crush phenomenon occurs, so that it can be notified to the subsequent signal processing circuit whether the black-crush phenomenon occurs.

The read-out unit reads out the difference during the analog to digital conversion. Thus, throughput of the signal output can be enhanced.

BRIEF DESCRIPTION OF THE DRAWINGS

These and the other objects, advantages and features of the invention will become apparent from the following description thereof taken inconjunction with the accompanying drawings which illustrate specific embodiments of the invention.

In the drawings.

DESCRIPTION OF THE PREFERRED EMBODIMENT

Embodiment 1
<Skeleton Framework>

With reference to the drawings, a description is given of a solid-state imaging device pertaining to an embodiment of the present invention.

Figure 4:
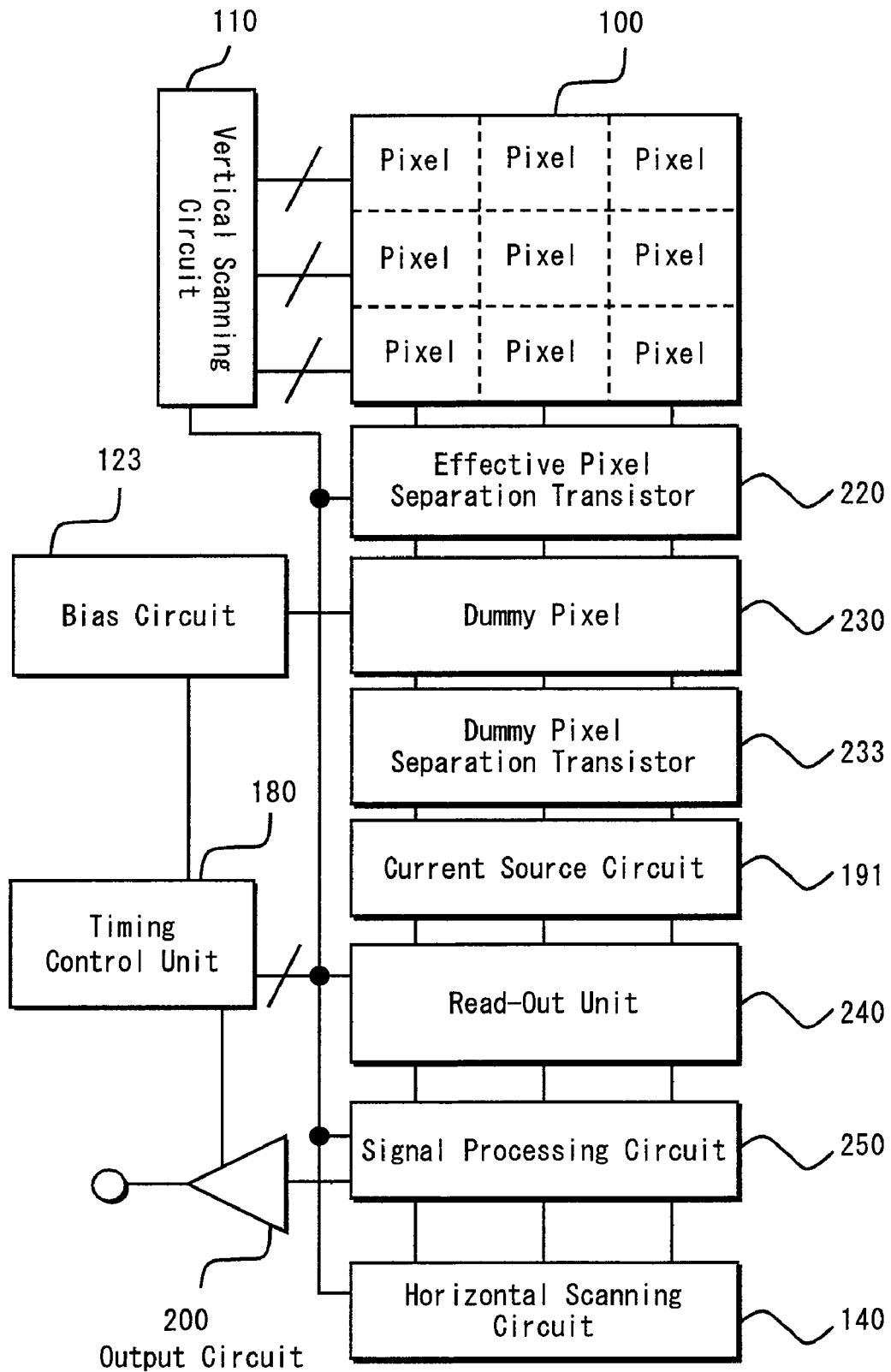
FIG. 4 is a schematic block diagram of a solid-state imaging device pertaining to Embodiment 1 of the present invention.

FIG. 4 is a schematic block diagram pertaining to Embodiment 1 of the present invention.

According to FIG. 4, the solid-state imaging device has a pixel area 100 where a plurality of pixels are arranged in a matrix, a vertical scanning circuit 110 that selects a pixel row, an effective pixel separation transistor 220, a dummy pixel 230, a dummy pixel separation transistor 233, a current source circuit 191, a read-out unit 240, a signal processing circuit 250, a horizontal scanning circuit 140, an output circuit 200 composed of an analog front end, an A/D convertor (ADC), an output processing unit or the like, a bias circuit 123 supplying a reference voltage to the dummy pixel, and a timing control unit 180. The effective pixel separation transistor 220, the dummy pixel 230, the dummy pixel separation transistor 233, the current source circuit 191, the read-out unit 240, the signal processing circuit 250 are provided at each column of pixels.

<Detailed Configuration>

Subsequently, with reference to FIG. 5, a detailed configuration of FIG. 4 is described.

Figure 5:
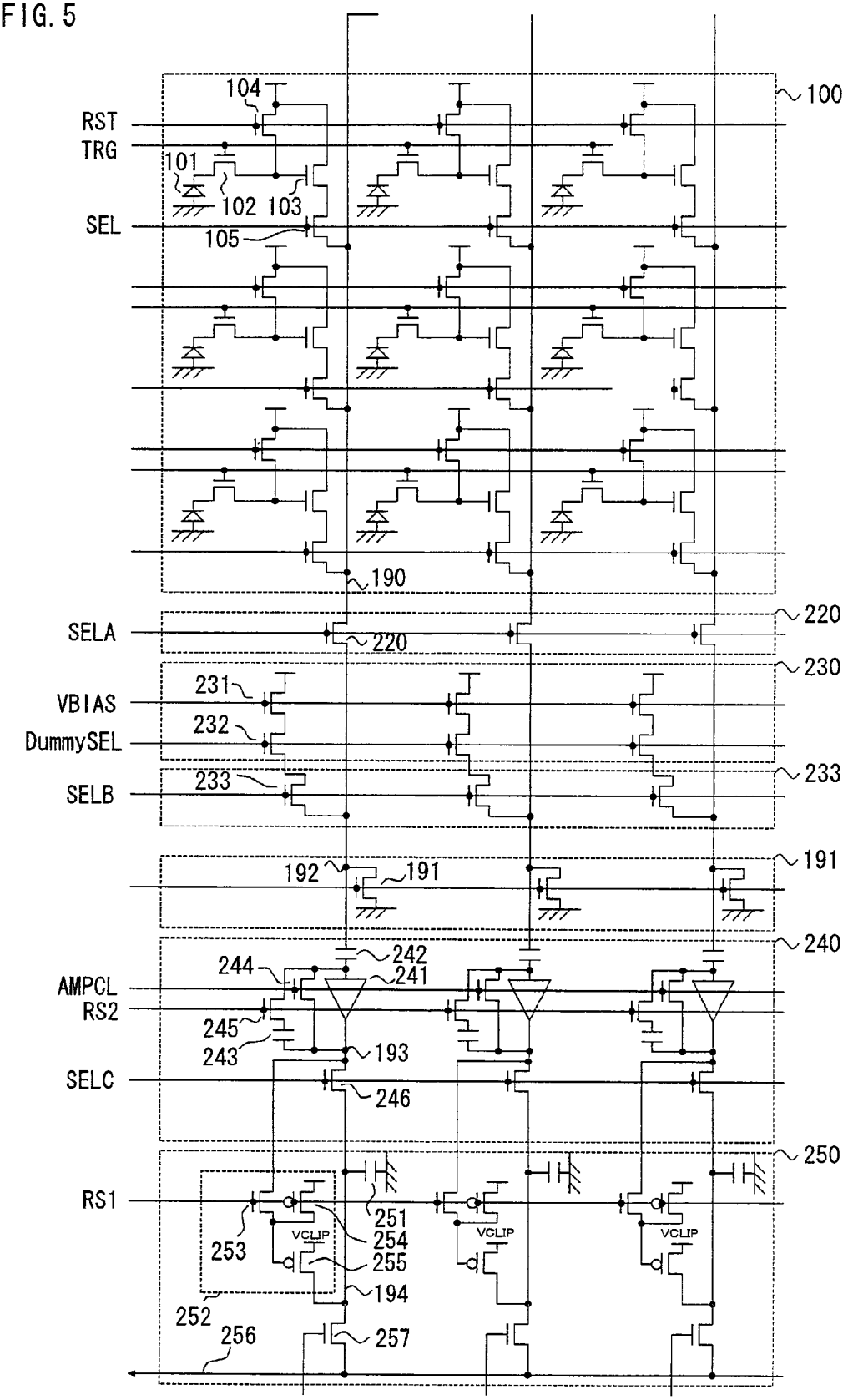
FIG. 5 is a circuit configuration diagram of the solid-state imaging device pertaining to Embodiment 1 of the present invention.

As shown in FIG. 5, each pixel of the pixel area 100 is provided with a photodiode 101 performing photoelectric conversion and pixel transistors, such as a transfer transistor 102, an amplification transistor 103, a reset transistor 104 and a selection transistor 105.

In addition, the vertical scanning circuit 110 performs control so that (i) a transfer signal (TRG), a selection signal (SEL), a reset signal (RST) and the like are supplied to each pixel transistor, (ii) signal electric charge obtained by the photodiode 101 are converted to a pixel signal (SIG) and (iii) the pixel signal (SIG) is outputted to the vertical signal line 190. Note that the vertical signal line 190 is provided at each column of pixels, and that each vertical signal line 190 is connected to the effective pixel separation transistor 220. An output terminal of the effective pixel separation transistor 220 is connected to the dummy pixel 230, the current source circuit 191, and the read-out unit 240. A signal amplified by the read-out unit 240 is inputted into the signal processing circuit 250.

The signal processing circuit 250 has a signal retention capacitor 251, a black-crush signal replacement circuit 252, and a horizontal selection transistor 257. The signal retention capacitor 251 retains therein pixel signals outputted from the effective pixel. The horizontal selection transistor 257 is turned ON or OFF in response to control by the horizontal scanning circuit 140. The pixel signals for one line retained in the signal retention capacitor 251 for each row are sequentially outputted to the horizontal signal line 256 in response to control by the horizontal scanning circuit 140. A function of the black-crush signal replacement circuit 252 is described later.

The dummy pixel 230 includes a pixel dummy amplification transistor 231 and a pixel dummy selection transistor 232. Connected to a gate of the pixel dummy amplification transistor 231 is a bias circuit 123. Into each column of pixels, a uniform bias voltage $V_{BIAS}$ is inputted. Supplied to a gate of the pixel dummy selection transistor 232 is a selection pulse (DummySEL). The dummy pixel is connected to the vertical signal line 190, via the dummy pixel separation transistor 233.

The read-out unit 240 has an inverting amplifier 241, an amp input capacitor 242, a feedback capacitor 243, an amp reset switch 244, and a gain selector switch 245.

In addition, a node 193 that is an output terminal of the read-out unit 240 is connected to an amp load cut transistor 246 and the black-crush signal replacement circuit 252. Output terminals of the amp load cut transistor 246 and the black-crush signal replacement circuit 252 are both connected to the signal retention capacitor 251. A level of the signal retained in the signal retention capacitor 251 is sequentially read out, via the horizontal selection transistor 257, by the horizontal signal line 256.

In the read-out unit 240, during the signal read-out period, the gain selector switch 245 is always ON. First, the amp reset switch 244 is turned ON, and a level of the reset signal outputted from the effective pixel is sampled. Subsequently, after the amplifier reset switch 244 is turned OFF, a level of a pixel signal outputted from the effective pixel is sampled. Thus, a level obtained by multiplying (i) a difference ($V_{SIG}$) between the level of the reset signal and the level of the pixel signal and (ii) an amp gain can be outputted. This is a circuit generally used as a CDS circuit. If the amp input capacitor 242 is denoted as $C_1$, and the feedback capacitor 243 is denoted as $C_2$, the amp gain can be denoted as $C_1/C_2$. The gain generally used multiplies approximately 1-16 times.

On the other hand, in the black-crush judging period subsequent to the signal read-out period, the gain selector switch 245 is turned OFF. First, the amp reset switch 244 is turned ON. The level of the pixel signal outputted from the effective pixel is sampled. Subsequently, after the amplifier reset switch 244 is turned OFF, the level of a bias signal outputted from the dummy pixel is sampled. Thus, a level obtained by multiplying (i) a difference ($V_{SIG}-V_{BIAS}$) between the level of the pixel signal and the level of the bias signal and (ii) an amp gain can be outputted. Since the gain selector switch 245 is OFF at this time, the amp gain is $C_1/0$. Note that the difference ($V_{SIG}-V_{BIAS}$) corresponds to the black crush judgment signal.

However, in practice, the amp gain is not infinite so that in principle, the amp gain cannot be a value equal to or higher than an open-loop gain of the inverting amplifier 241. However, generally, a very high gain increasing from tenfold to hundredfold can be achieved. That is to say, for judging the occurrence of the black-crush phenomenon, if the black crush judgment signal ($V_{SIG}-V_{BIAS}$) is a small value, by amplifying the difference from tenfold to hundredfold, it can be accurately judged whether the black-crush phenomenon does not occur ($V_{SIG}-V_{BIAS}$)<0 or the black-crush phenomenon occurs ($V_{SIG}-V_{BIAS}$)>0.

Subsequently, a description is given of the black-crush signal replacement circuit 252.

The black-crush signal replacement circuit 252 is a circuit that replaces a signal level retained in the signal retention capacitor 251 with a level $V_{CLIP}$ equal to or higher than a saturation signal $V_{SAT}$ of the photodiode 101 when the read-out unit 240 judges that the black-crush phenomenon occurs.

The transistors 253 and 254 are transistors each controlling operation/non-operation of the black-crush signal replacement circuit 252. The transistor 254 is a reset transistor and is OFF only when the replacement operation is performed. When the replacement operation is not performed, the transistor 254 is ON, and the transistor 253 is turned OFF. Consequently, the transistor 255 is always OFF so that the replacement operation is not performed.

According to a gate level, the transistor 255 judges whether or not to output the replacement signal $V_{CLIP}$ to the signal retention capacitor 251. When the replacement operation is not performed, the transistor 255 is controlled to be turned OFF by the transistor 254. On the other hand, when the replacement operation is performed, the transistor 253 is turned ON, and a judgment signal of the read-out unit 240 is inputted to the gate. When the black-crush phenomenon occurs, the judgment by the read-out unit 240 shows ($V_{SIG}-V_{BIAS}$)>0. At this time, the node 193 comes to approximate a GND level. Then, the transistor 255 is turned ON, and the signal level of the pixel signal retained in the signal retention capacitor 251 is replaced with a level VCLP equal to or higher than the saturation signal $V_{SAT}$. In a status where the black-crush phenomenon does not occur, the judgment shows ($V_{SIG}-V_{BIAS}$)<0. At this time, since the node 193 approximates the $V_{DD}$ level, the transistor 255 is OFF so that the replacement operation is not performed.

Note that although the black-crush signal replacement circuit 252 is an example according to the present invention, the present invention is not particularly limited to this circuit configuration. For example, instead of replacing a signal of the signal retention capacitor 251, the black-crush judgment signal may be retained in another signal retention unit. In addition, as a means for retaining black-crush judgment information, the signal may be retained in the capacity as an analog signal, or may be converted to a digital signal and retained therein. For example, after a pixel signal is converted from analog to digital, with the use of the black-crush judgment information, the digital signal of the pixel signal may be replaced.

In addition, the amp load cut transistor 246 is ON during the signal read-out period, and OFF during the black-crush judging period. Thus, during the black-crush judging period, load capacity of the amp can be reduced so that the black-crush judging period can be reduced. In addition, with this configuration, at a point when the black-crush judgment is performed, the pixel signal has been already retained by the signal retention capacitor 251, and the read-out operation of the pixel signal is completed. Accordingly, horizontal read-out of the pixel signals and the black-crush judgment operation may be simultaneously performed in parallel.

Figure 6:
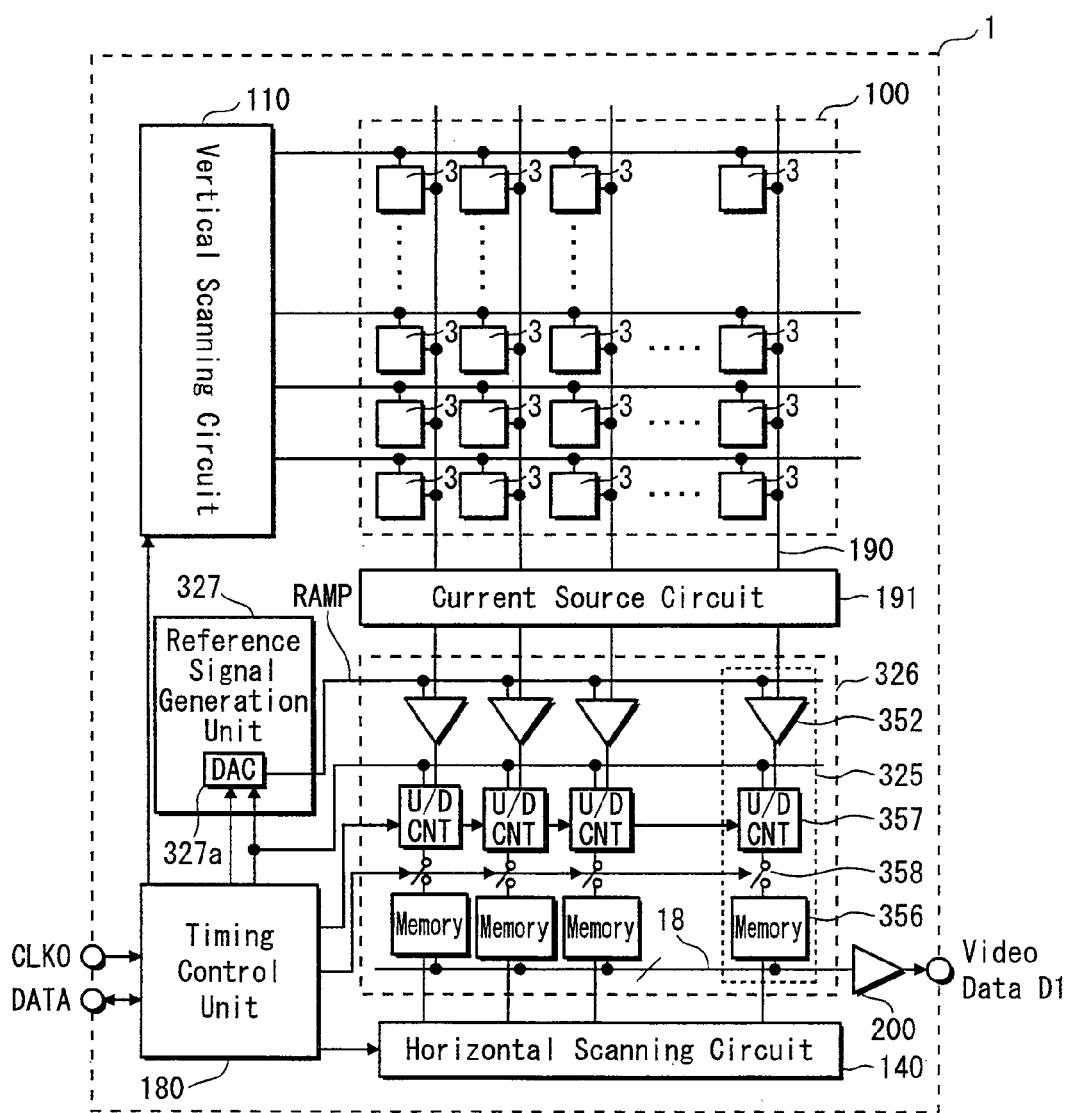
FIG. 6 is a schematic block diagram of a solid-state imaging device having an AD converter circuit at each column, which is available in recent years.

In a circuit configuration available these days, an AD converter circuit that simultaneously converts signals in the same pixel row from analog to digital is provided at each pixel column. Particularly, as shown in FIG. 6, when the black-crush correction circuit of the present invention is applied to the above circuit configuration, a great effect can be created. While the signals retained in the signal retention capacitor 251 are converted from analog to digital, the black-crush judgment can be also performed.

Figure 7:
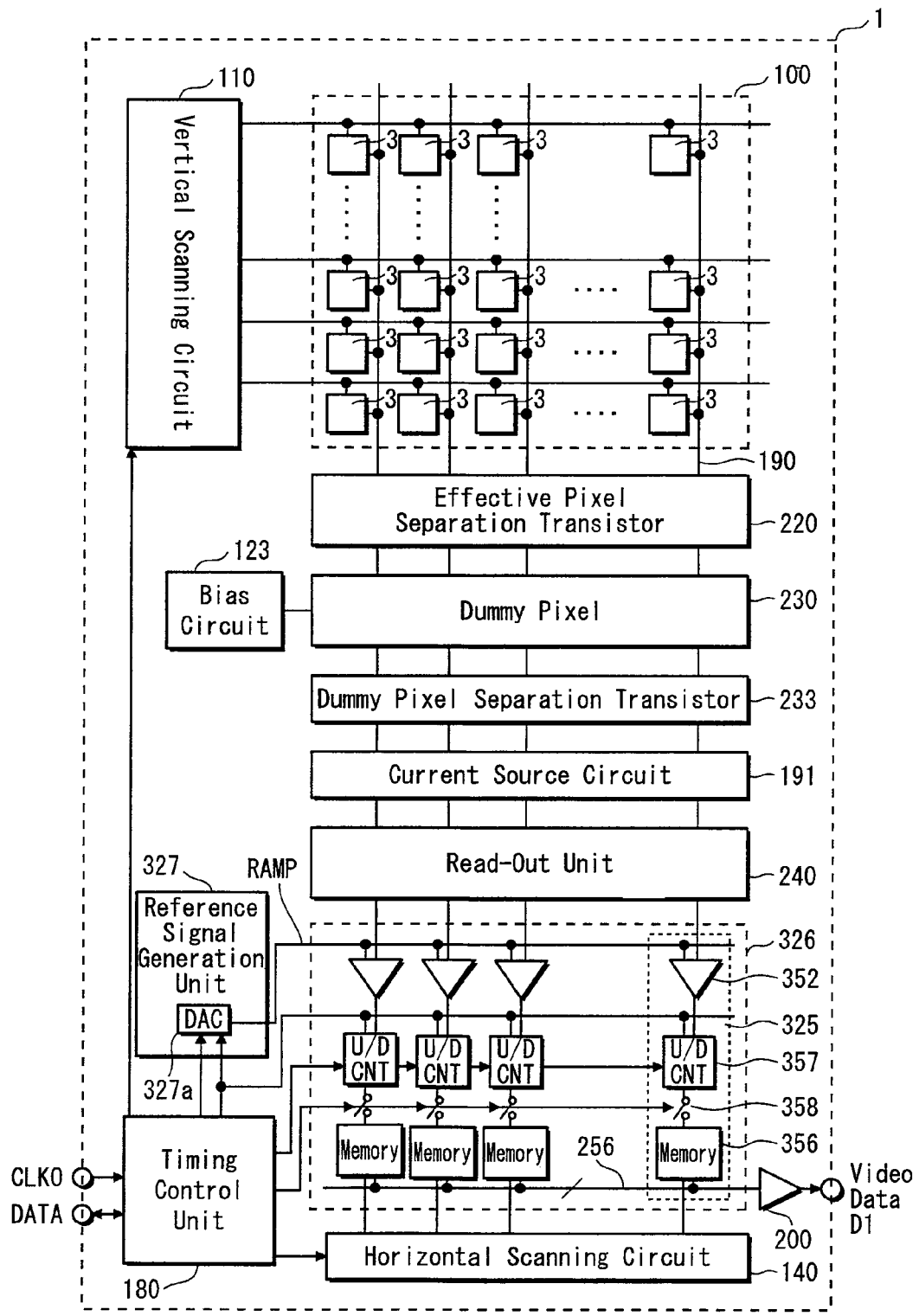
FIG. 7 is a schematic block diagram of the solid-state imaging device having the AD converter circuit at each column to which a configuration of Embodiment 1 is applied.

FIG. 7 shows a circuit configuration of the solid-state imaging device shown in FIG. 6 to which features of this embodiment are included. As shown in FIG. 7, between the vertical signal line 190 and a current source circuit 191, the effective pixel separation transistor 220, the dummy pixel 230, and the dummy pixel separation transistor 233 are provided. In addition, between the current source circuit 191 and a column processing unit 326, the signal amplifying and read-out unit 240 is provided so that the black-crush judgment can be performed.

A column AD converter unit 325 has a comparator 352 having built therein the signal retention capacitor 251, an updown counter 357 that counts up or down till the output by the comparator 352 is inversed, a memory 356 that stores therein a count value retained in the updown counter 357, and a switch 358.

During the signal read-out period of the effective pixel, the read-out unit 240 outputs a signal level of the effective pixel. The comparator 352 retains therein the signal level of the effective pixel.

In the subsequent black-crush judging period, the reference signal generation unit 327 generates a reference signal RAMP having a ramp waveform. The comparator 352 compares a signal level of the effective pixel and a signal level of a reference signal, and outputs a result of the comparison. The updown counter 357 continues to count from when the reference signal generation unit 327 starts outputting the reference signal RAMP till the comparison result by the comparator 352 is inversed. The count value at this time corresponds to the signal level retained in the signal retention capacitor 251. The count value is read into the memory 356. Note that during the black-crush judging period, in parallel with the above AD conversion operation, the read-out unit 240 performs the black-crush judgment operation, and a black-crush judgment signal that is a result of the judgment is outputted. Note that when the black-crush judgment signal indicates the black-crush phenomenon occurs, instead of the count value obtained from the updown counter 357, a digital value of which all bits are "1" may be written into the memory 356. Alternatively, the black-crush judgment signal may be added to the count value as 1 bit information, and the added value may be written into the memory 356.

<Operation>

Subsequently, a description is given of operation of the solid-state imaging device pertaining to this embodiment.

Figure 8:
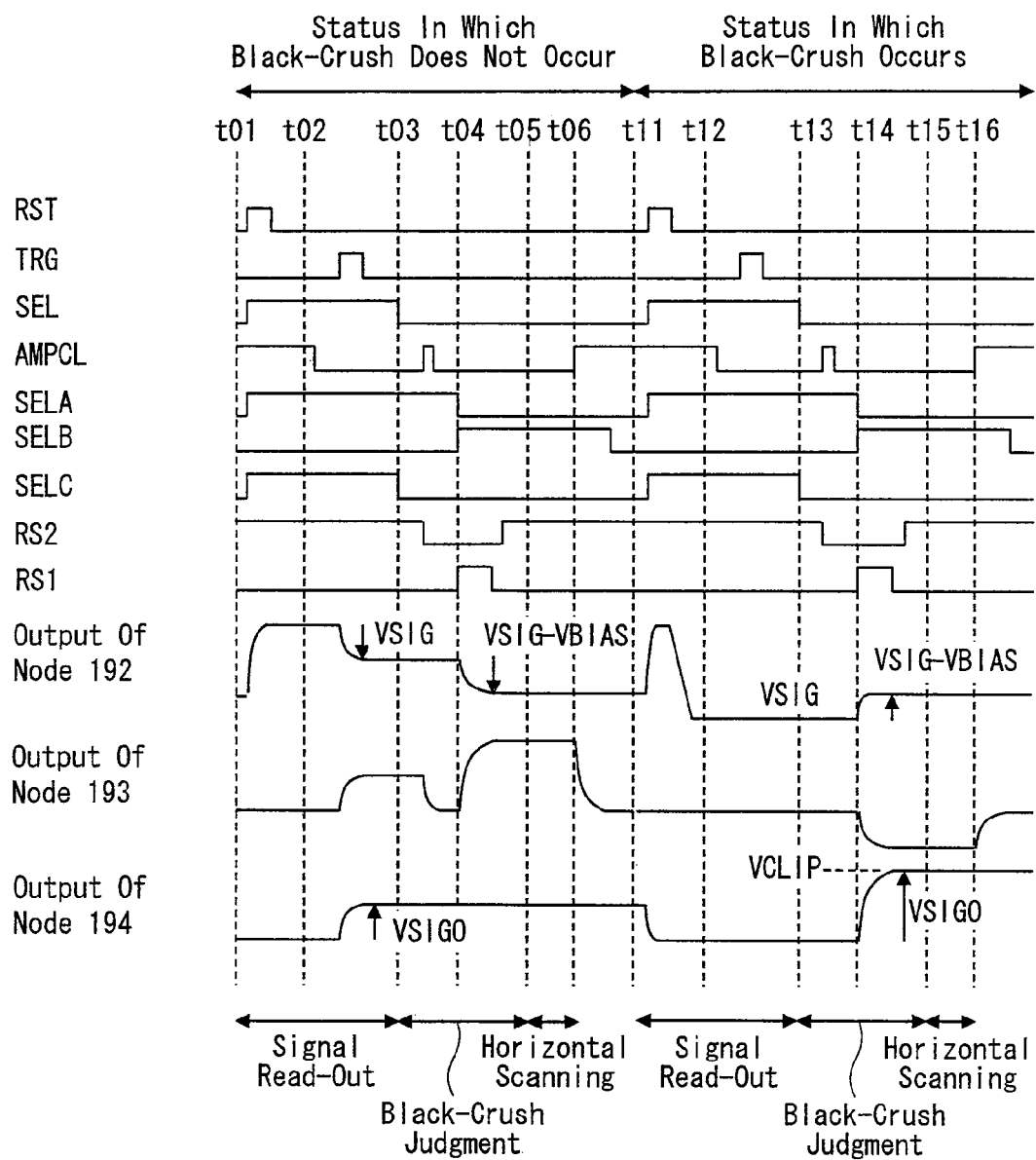
FIG. 8 is a timing diagram of a horizontal period pertaining to Embodiment 1 of the present invention.

FIG. 8 is a timing diagram of a horizontal period pertaining to this embodiment of the present invention.

Although, as with the selection signal (SEL), a pulse may be applied to the dummy selection signal (DummySEL), in this embodiment, the pulse is at a fixed high level.

First, a description is given of a status in which the black-crush phenomenon does not occur.

In the period from t01 to t02 as a signal outputted to the node 192 that is an output terminal of the source follower, the reset signal (RST) is applied to an effective pixel, and a level of the gate of the amplification transistor 103 becomes $V_{DD}$. Since the amplification transistor 103 is a source follower circuit, a source level of the amplification transistor 103 is lower than a gate level VG by approximately a threshold value Vth of the transistor. As a signal outputted to the node 192 that is an output terminal of the source follower, the source level of the amplification transistor 103 is at a level ($V_{DD}-V_{TH}-V_{DS}$) further subtracted $V_{DS}$ of the selection transistor 105 and the effective pixel separation transistor 220. Herein, a power supply voltage is denoted as $V_{DD}$, the signal is denoted as $V_{SIG}$, a voltage drop in the selection transistor 105 and the effective pixel separation transistor 220 is collectively denoted as $V_{DS}$. In order to condense the expression, the substrate bias effect of the transistor is ignored, and a voltage drop between the source and the gate of the amplification transistor 103 caused by the source follower operation is defined by $V_{TH}$ ($V_{TH}$ is approximately the threshold voltage Vth of the transistor). Note that since an amp clamp signal (AMPCL) is applied in this period, a signal level of the node 193 is clamped to a reset level of the inverting amplifier 241.

In the period from time t02 to t03, a read-out signal (TRG) is applied to the effective pixel. A signal level of the node 192 is lowered by $V_{SIG}$ that is a signal level corresponding to a charge amount accumulated in the photodiode 101, and the signal level shows ($V_{DD}-V_{TH}-V_{DS}-V_{SIG}$). On the other hand, since the inverting amplifier 241 is clamped to a reset level when the reset signal is read out, the signal level of the node 193 is higher than the reset level of the inverting amplifier 241 by $V_{SIG}*\text{GAIN}=V_{SIGO}$ that is a multiplication of $V_{SIG}$ and the amp gain.

The signal level of the node 193 is retained by the signal retention capacitor 251 via the amp load cut transistor 246.

The period from time t03 to t05 is the black-crush judging period. By making the signal (RS2) at a low level, the gain selector switch 245 is turned OFF, and the inverting amplifier 241 achieves a high gain increasing from tenfold to hundredfold. By applying the amp clamp signal (AMPCL) in this state, the level of $V_{SIG}$ of the node 192 is clamped, and the level of the node 193 is clamped again to the reset level of the inverting amplifier 241.

Subsequently, by making a signal (SELA) at a low level in accordance with a timing of time t04, the effective pixel separation transistor 220 is turned OFF. By doing so, the load capacity of the dummy pixel 230 is reduced, and a black-crush judgment output signal can be outputted to the node 192 in a short period of time.

By making a signal (SELB) at a high level simultaneously with the signal (SELA) made to be at a low level, the dummy pixel separation transistor 233 is turned ON. By switching ON the dummy pixel separation transistor 233, the level of the black-crush judgment signal ($V_{DD}-V_{BIAS}-V_{TH}-V_{DS}$) is read out by the node 192. Herein, the level, ($V_{DD}-V_{BIAS}$) is supplied from the bias circuit to the gate of the pixel dummy amplification transistor 231.

Since the signal level ($V_{DD}-V_{TH}-V_{DS}-V_{SIG}$) is clamped in the period from time t03 to t04, a signal level of a voltage amplitude obtained by multiplying (i) a difference ($V_{SIG}-V_{BIAS}$) between the signal level of ($V_{DD}-V_{TH}-V_{DS}-V_{SIG}$) and the signal level ($V_{DD}-V_{BIAS}-V_{TH}-V_{DS}$) and (ii) a gain of the inverting amplifier 241 is outputted. The signal level of the node 192 becomes a level of multiplication of a reset level of the inverting amplifier 241 and ($V_{SIG}-V_{BIAS}$)*GAIN2. The GAIN2 achieves a high gain increasing from tenfold to hundredfold.

In a status where the black-crush phenomenon does not occur, since ($V_{SIG}-V_{BIAS}$)<0, the signal level is amplified by the inverting amplifier 241 from tenfold to hundredfold and outputted to the node 193. The signal level of the node 193 comes to approximate the level of the power supply voltage $V_{DD}$.

Subsequently, by making the signal (RS1) at a high level, the black-crush signal replacement circuit 252 is operated.

Since the signal level of the node 193 is at a level approximating $V_{DD}$, the transistor 255 of a Pch transistor remains OFF, and the black-crush signal replacement circuit 252 does not replace the signal level of the signal retention capacitor 251.

In addition, since the signal (SELC) is at a low level during the black-crush judging period from t03 to t05, the amp load cut transistor 246 is OFF. Since the amp load cut transistor 246 is OFF, the load capacity of the inverting amplifier 241 is reduced, and the black-crush judgment signal can be outputted from the inverting amplifier 241 to the black-crush signal replacement circuit 252 in a short period of time.

In the period from time t05 to t06, a signal level retained in the signal retention capacitor 251 is horizontally transferred in series, and a signal corresponding to VSIO obtained by multiplying the amp gain and $V_{SIG}$ is outputted to the output circuit 200.

Subsequently, a description is given of a state where the black-crush phenomenon occurs.

In the period from time t11 to t12, the reset signal is read out. However, due to the black-crush phenomenon, after the signal (RST) is applied, a large amount of signal electric charges are overflowed from the photodiode 101. As a result, the level of the gate of the amplification transistor 103 is dramatically lowered. At a point of time t12 when the read-out of the reset signal is completed, the signal level of the node 192 is lowered to approximately the GND level.

In the period from time t12 to t13, the pixels are read out. Since the signal level of the node 192 is lowered to approximately the GND level, the signal level of the node 192 scarcely changes. This shows occurrence of the black-crush phenomenon. Since the signal level of the node 192 scarcely changes, the signal level of the node 193 scarcely changes from the reset level of the inverting amplifier 241. Thus, the reset level of the inverting amplifier 241 corresponding to a black signal is retained in the signal retention capacitor 251.

In the period from time t13 to t15, the black-crush judgment is performed.

In the period from time t13 to t14, since the signal level $(V_{DD}-V_{TH}-V_{DS}-V_{SIG})$ is clamped, a signal level obtained by multiplying (i) a voltage amplifier of a difference between the signal level $(V_{DD}-V_{TH}-V_{DS}-V_{SIG})$ and the signal level $(V_{DD}-V_{BIAS}-V_{TH}-V_{DS})$ and (ii) a gain of the inverting amplifier 241 is outputted. The signal level of the node 192 becomes a level of a multiplication of the reset level of the inverting amplifier 241 and $(V_{SIG}-V_{BIAS})$*GAIN2. As described above, the GAIN2 achieves a high gain increasing from tenfold to hundredfold.

In a status where the black-crush phenomenon occurs, since $(V_{SIG}-V_{BIAS})>0$, the difference $(V_{SIG}-V_{BIAS})$ is amplified from tenfold to hundredfold by the inverting amplifier 241, and the amplified difference is outputted to the node 193. The signal level of the node 193 becomes approximately GND.

Subsequently, by making the signal (RS1) at a high level, the black-crush signal replacement circuit 252 is operated.

Since the signal level of the node 193 approximates GND, the transistor 255 of the Pch transistor is turned ON. Subsequently, the signal level is replaced by the signal level $V_{CLIP}$ corresponding to a signal level equal to or higher than the saturation level $V_{SAT}$. That is to say, the signal level corresponding to the black signal retained in the signal retention capacitor 251 is replaced by the signal level $V_{CLIP}$.

In the period from time t05 to t06, the signal level $V_{CLIP}$ retained in the signal retention capacitor 251 is horizontally transferred in series, and the signal level $V_{CLIP}$ is outputted to the output circuit 200. Thus, the black-crush correction can be performed.

<Comparison>

According to a conventional solid-state imaging device, if the characteristic of the pixel dummy amplification transistor 121 varies according to each pixel column, common noises are superimposed on pixel signals in the same column. Consequently, fixed pattern noises, so-called longitudinal noises, unfortunately occur. On the other hand, according to the solid-state imaging device of the present invention, even when the characteristic of the pixel dummy amplification transistor 231 varies according to each pixel column, the longitudinal noises can be reduced, which can realize improvement of the image quality. The following describes the reason thereof.

Figure 1:
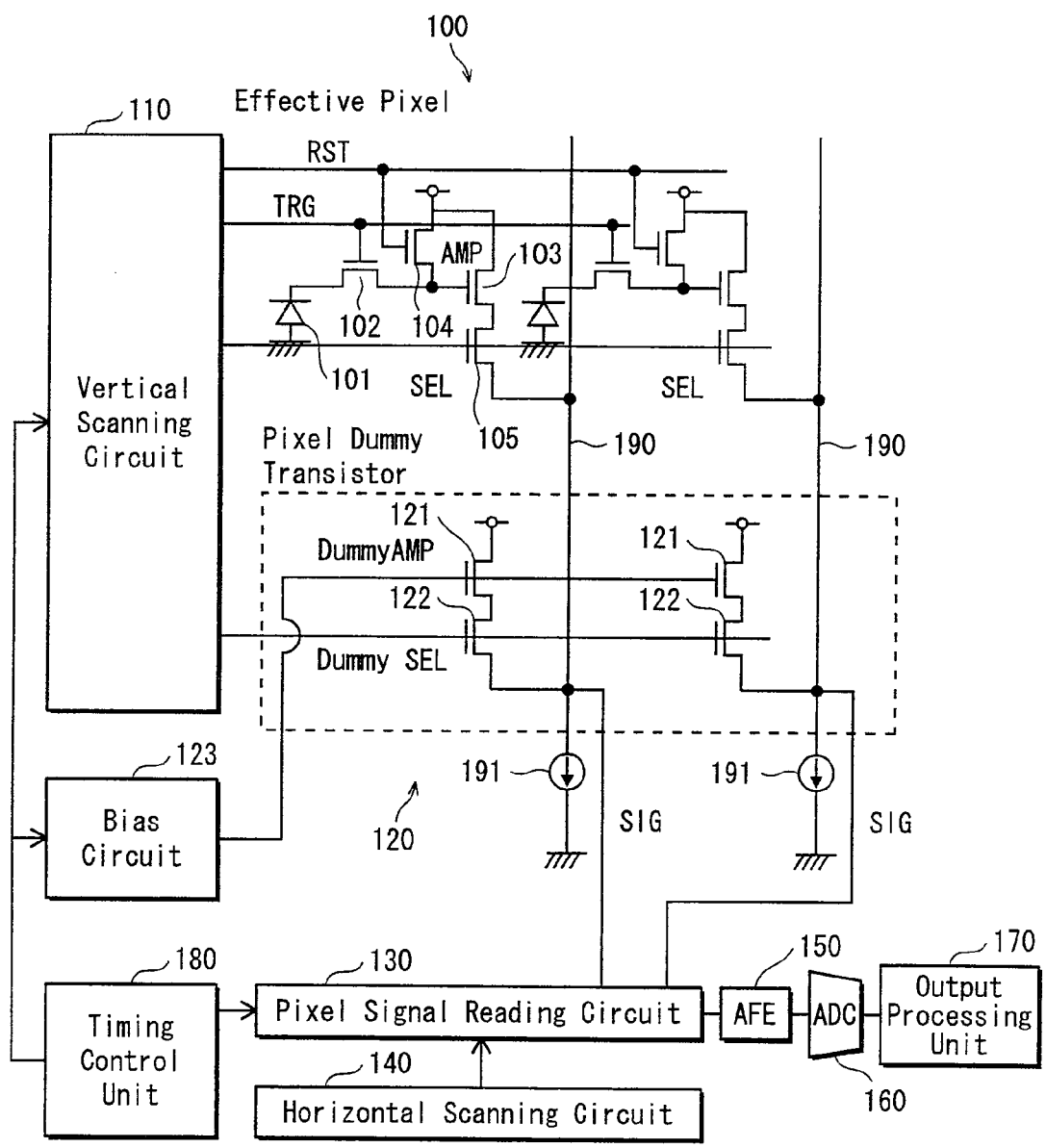
FIG. 1 is a schematic block diagram showing a conventional solid-state imaging device.
Figure 2:
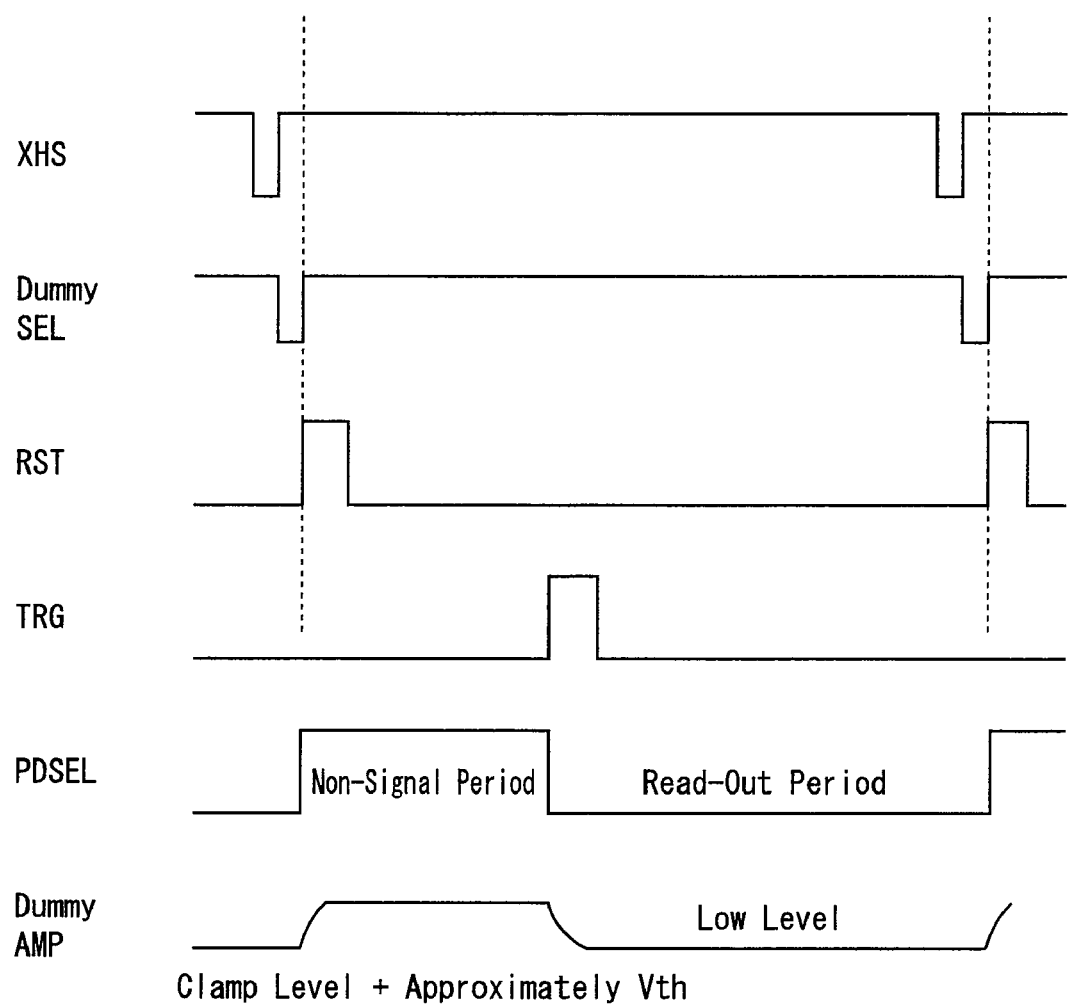
FIG. 2 is a timing diagram of a horizontal period for correcting conventional longitudinal noises with regard to a gain.
Figure 3:
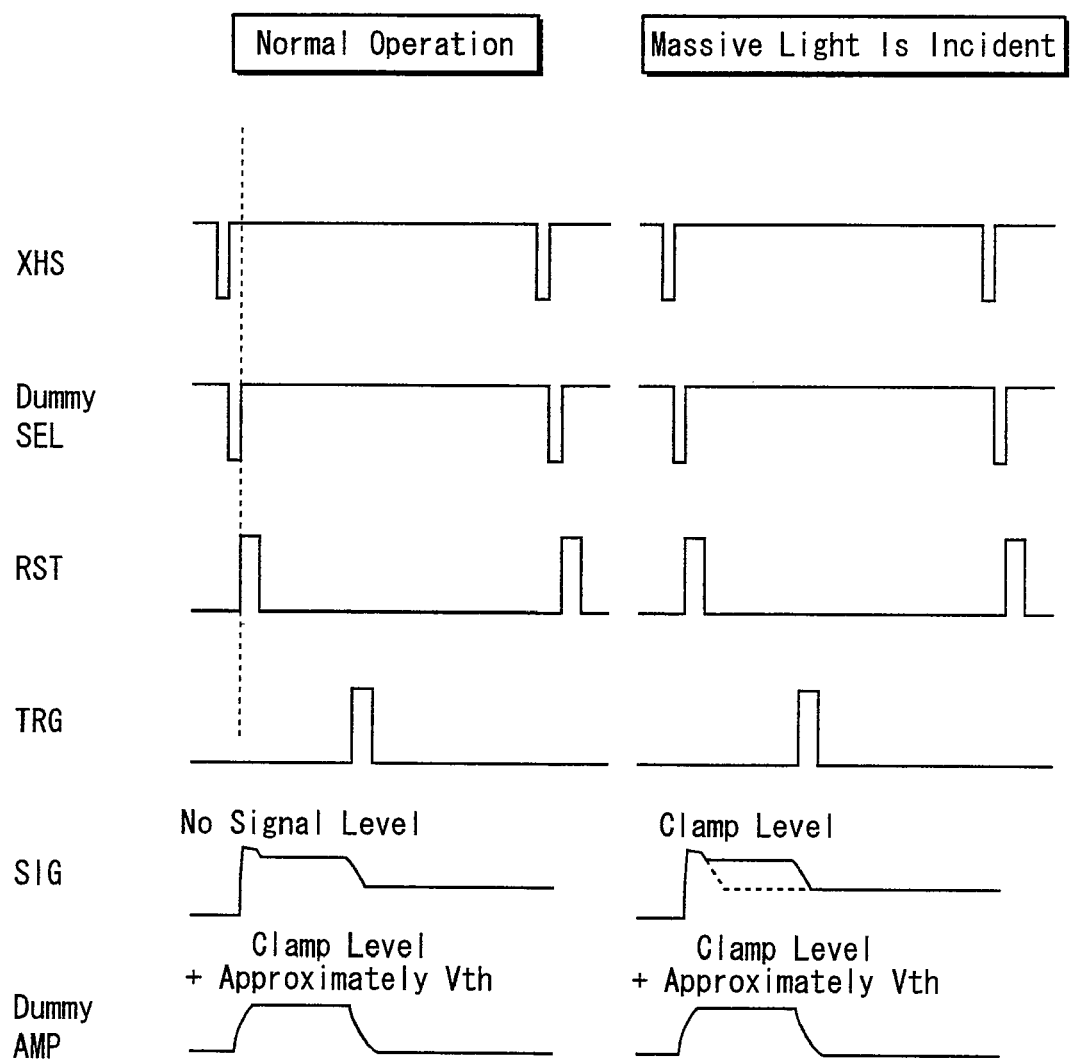
FIG. 3 is a timing diagram of a horizontal period for correcting conventional longitudinal noises with regard to a gain.

First, according to the conventional solid-state imaging device (FIGS. 1-3), during the non-signal period, a bias voltage that is a level approximating $V_{DD}$ is inputted to the gate of the pixel dummy amplification transistor 121. On the other hand, during the signal read-out period, a bias voltage in luminous time to be corrected is inputted to the gate of the pixel dummy amplification transistor 121. According to this driving method, due to the influence of the pixel dummy amplification transistor 121, the vertical signal line 190 has a potential difference between in the non-signal period and in the signal read-out period.

For example, the ON resistance of the amplification transistor 103 in the effective pixel is denoted as $R_1(t)$, the ON resistance of the pixel dummy amplification transistor 121 is denoted as $R_2(t)$. The reason why (t) is shown is that the gate level of the pixel dummy amplification transistor 121 is different between in the non-signal period and in the signal read-out period. The ON resistance of each transistor in the non-signal period is defined as $R_1(t_1)$ and $R_2(t_1)$, and the ON resistance of each transistor in the signal read-out period is defined as $R_1(t_2)$ and $R_2(t_2)$. A resistance value of the amplification transistor 103 in an effective pixel varies according to presence or absence of a signal read out from the photodiode 101. In the description of this problem, the non-signal period (dark time) is taken as an example, and the ON resistance $R_1(t_1)$ and $R_1(t_2)$ in the effective pixel are constant in the non-signal period and the signal read-out period, and denoted as $R(t_1)$.

The combined resistance of the amplification transistor of the pixel source follower circuit in the non-signal period can be expressed by the parallel resistance of $R_1(t_1)$ and $R_2(t_1)$. Thus, the combined resistance is denoted as $R_1(t_1)//R_2(t_1)$. If the current of the pixel source follower circuit is defined as Io, and if the power supply voltage of the pixel source follower is defined as $V_{DD}$, the signal level of the vertical signal line 190 can be denoted as $V_{DD}-R_1(t_1)//R_2(t_1)\times Io$. On the other hand, since the combined resistance in the signal read-out period is $R_1(t_2)//R_2(t_2)$, the signal level of the vertical signal line 190 is $V_{DD}-R_1(t_2)//R_2(t_2)\times Io$.

CDS is performed on an output signal of each vertical signal line 190 by the pixel signal reading circuit 130, the AFE 150, or the output processing unit 170, and a potential difference of the vertical signal line between in the non-signal period and in the signal read-out period is outputted as a pixel signal. According to the above expression, although the potential difference of the vertical signal line between in the non-signal period and in the signal read-out period can be expressed by $\{R_2(t_2)-R_2(t_1)\}/\{1+R_2(t_2)/R_1(t_1)\}/\{1+R_2(t_1)(t_1)\}\times Io$. In a condensed expression, if the potential difference is approximated by $R_2(t_1)/R_1(t_1)=1$, and $R_2(t_1)/R_1(t_1)=1$, the potential difference of the vertical signal line can be denoted as $\{R_2(t_2)-R_2(t_1)\}/4\times Io$.

Due to the influence of the variations in the characteristics of the processes, if the ON resistance of the pixel dummy amplification transistor 121 in each pixel column varies, and if the value of $\{R_2(t_2)-R_2(t_1)\}/4\times Io$ varies according to each column, longitudinal noises occur.

Subsequently, with the use of the configuration of the dummy pixel 230, a description is given of a reason why the present invention can reduce longitudinal noises caused by the variations in the characteristic of the pixel dummy amplification transistor.

First, the effective pixel separation transistor 220 is provided being connected between the vertical signal lines 190 and the current source circuit 191. The effective pixel separation transistor 220 operates the pixel source follower circuit in the effective pixel, and outputs a signal of the effective pixel to the node 192. The effective pixel separation transistor 220 is ON during the signal read-out period, and outputs a signal outputted from the effective pixel to the node 192. More specifically, a signal accumulated in the photodiode 101 is inputted to the gate of the amplification transistor 103 via the transfer transistor 102. Since this amplification transistor 103 is a source follower circuit, the source level of the amplification transistor 103 is at a level lower than the gate level VG by a threshold value Vth of the transistor. Accordingly, as a signal level outputted to the node 192, the source level becomes a level from which $V_{DS}$ of the selection transistor 105 and the effective pixel separation transistor 220 is further subtracted.

At this time, the level of the node 192 can be expressed as follows.

$$V_{DD}-V_{SIG}-V_{TH}-V_{DS} \quad \text{(Expression 1)}$$

On the other hand, during the black-crush judging period, by switching OFF the effective pixel separation transistor 220 and by electrically separating the vertical signal line 190 from the node 192, the load capacity of the node 192 is reduced.

When the level supplied from the bias circuit 123 to the pixel dummy amplification transistor 231 is defined as $(V_{DD}-V_{BIAS})$, a voltage drop between the gate and the source of the pixel dummy amplification transistor 231 caused by the source follower operation is defined as $V_{TH2}$ ($V_{TH2}$ is approximately the threshold voltage Vth of the pixel dummy amplification transistor 231), and a voltage drop of the pixel dummy selection transistor 232 and the dummy pixel separation transistor 233 is collectively defined as $V_{DS2}$, as with the above, a signal level outputted from the dummy pixel 230 to the node 192 can be expressed as follows.

$$V_{DD}-V_{BIAS}-V_{TH2}-V_{DS2} \quad \text{(Expression 2)}$$

According to the present invention, whether the black-crush of the effective pixel occurs is judged by sequentially comparing (i) the signal level outputted from the effective pixel to the node 192 and (ii) the signal level outputted from the dummy pixel to the node 192.

More specifically, a difference of the signal level between (Expression 2) and (Expression 1) is expressed as follows.

$$V_{SIG}+V_{TH}+V_{DS}-(V_{BIAS}+V_{TH2}+V_{DS2}) \quad \text{(Expression 3)}$$

Note that as seen from (Expression 3), to accurately compare the pixel signal $V_{SIG}$ and the bias signal $V_{BIAS}$, it is desirable that the threshold values $V_{th}$ and $V_{TH2}$ of the transistor are equal to each other, and that $V_{DS}$ and $V_{DS2}$ of the transistor are equal to each other.

More specifically, it is desirable that a type of a transistor is common between (i) the pixel dummy amplification transistor 231 and the amplification transistor 103 of the effective pixel, (ii) the pixel dummy selection transistor 232 and the selection transistor 105 of the effective pixel, and (iii) the dummy pixel separation transistor 233 and the effective pixel separation transistor 220.

Note that "common" means that the transistors have the same processing flow, meaning the transistors have the same ion species, for example. In addition, by making a width (W) and a length (L) of the path have the same size ratio, $V_{TH}$ and $V_{TH2}$ can be identical with each other, and $V_{DS}$ and $V_{VD2}$ can be identical with each other.

In addition, the pixel dummy amplification transistor 231 and the dummy pixel separation transistor 233 each may be provided in plural in one column with a W/L ratio of the transistor of the effective pixel kept constant. By doing so, variations in the characteristics of the transistors can be suppressed. When $V_{TH}=V_{TH2}$ and $V_{DS}=V_{DS2}$ hold, (Expression 3) can be expressed as follows.

$$V_{SIG}-V_{BIAS} \quad \text{(Expression 4)}$$

$V_{SIG}$ expresses the level of the signal outputted from the effective pixel. If a maximum signal (saturation signal) outputted from the photodiode 101 is defined as $V_{SAT}$, a range of $V_{SIG}$ in a status where the black-crush phenomenon does not occur can be expressed as $0<=V_{SIG}<=V_{SAT}$.

On the other hand, in a status where the black-crush phenomenon occurs, in addition to $V_{SAT}$, since a signal is added by the high-intensity light incidence, the added signal caused by the black-crush phenomenon is defined as $V_{BLACK}$. In such a case, in the status where the black-crush phenomenon occurs, $V_{SIG}$ can be expressed as $V_{SIG}=V_{SAT}+V_{BLACK}$.

That is to say, by placing the bias signal $V_{BIAS}$ in a range of $V_{SAT}<V_{BIAS}<V_{SAT}+V_{BLACK}$, the black-crush judgment can be performed.

For example, in the status where the black-crush phenomenon does not occur, since $V_{SIG}<V_{BIAS}$ holds, the black-crush judgment signal shown in (Expression 4) shows $V_{SIG}-V_{BIAS}<0$. On the other hand, in the status where the black-crush phenomenon occurs, since $V_{SIG}>V_{BIAS}$ holds, $V_{SIG}-V_{BIAS}>0$ holds.

That is to say, according to the solid-state imaging device of this embodiment, whether the black-crush occurs in an effective pixel is judged by sequentially comparing (i) the signal level outputted from the effective pixel to the node 192 and (ii) the signal level outputted from the dummy pixel 230 to the node 192.

In addition, during the black-crush judging period, by switching OFF the effective pixel separation transistor 220, the load capacity of the vertical signal line 190 can be electrically cut. As a consequence, the black-crush judgment can be performed in a short period of time.

In addition, in this embodiment, by sequentially performing the read-out operation and the black-crush judgment of the effective pixel, the black-crush judgment can be performed without causing a potential difference of the vertical signal line between in the non-signal period and in the signal read-out period, which is a problem with regard to the conventional technique. As a result, longitudinal noises caused by the potential variations in the vertical signal line can be suppressed.

This is the reason why the solid-state imaging device of the present invention can reduce longitudinal noises even when the characteristic of the pixel dummy amplification transistors 231 varies according to each pixel column.

Thus, according to the solid-state imaging device pertaining to Embodiment 1 of the present invention, longitudinal noises caused by the variations in the characteristics of the transistors of the black-crush correction unit can be reduced, which is a problem the solid-state imaging device of the conventional technique cannot address. Accordingly, the image quality can be improved. Furthermore, by reducing longitudinal noises, it is unnecessary to additionally provide a longitudinal line correction circuit. Thus, low power consumption can be achieved by downsizing the area of the device and reducing the circuits.

(Embodiment 2)

Subsequently, a description is given of a solid-state imaging device pertaining to Embodiment 2 of the present invention. A description of the configuration of Embodiment 2 similar to that of Embodiment 1 is omitted.

Figure 9:
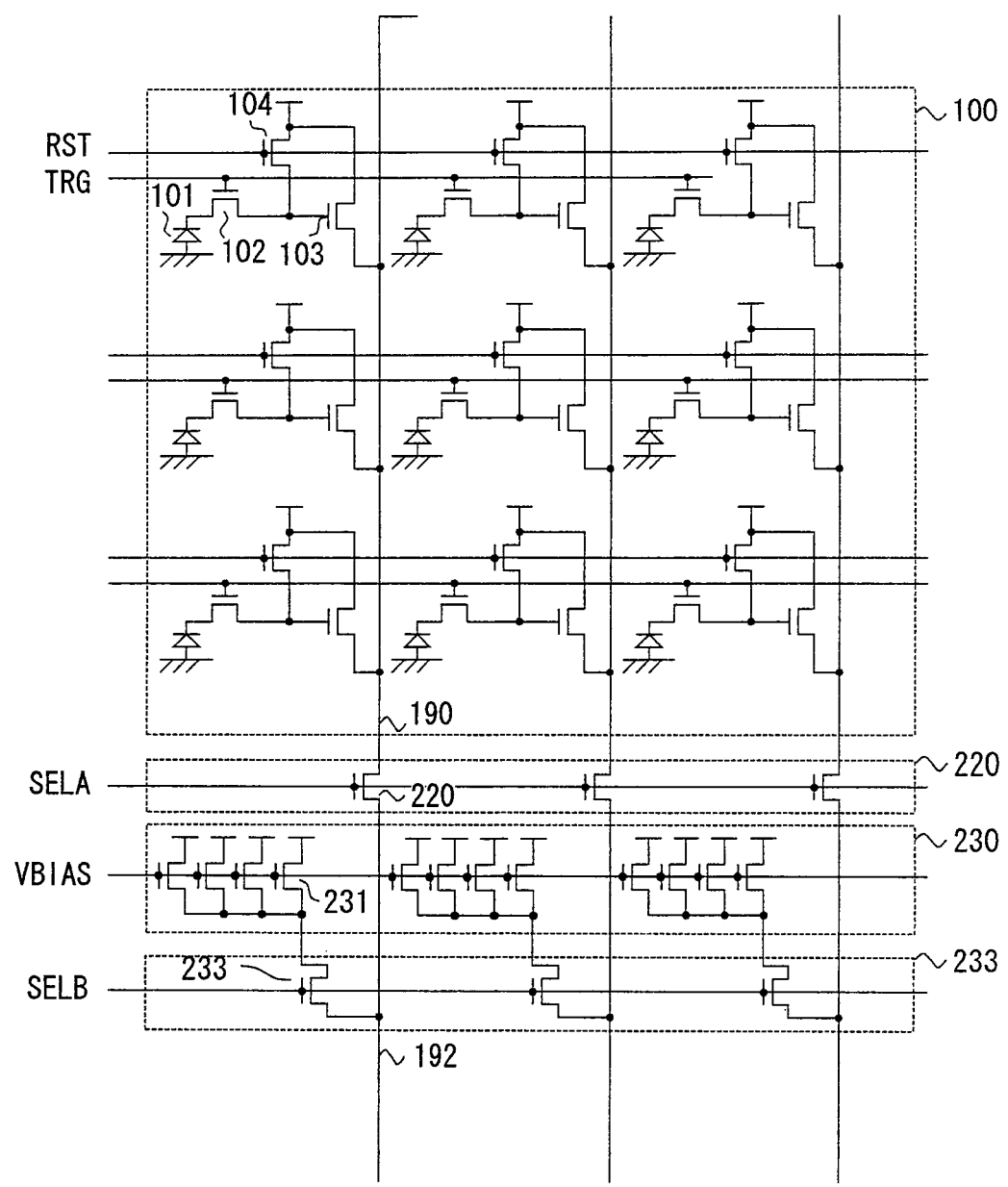
FIG. 9 is a circuit configuration diagram of a solid-state imaging device pertaining to Embodiment 2 of the present invention.

FIG. 9 is a circuit configuration diagram showing the solid-state imaging device pertaining to Embodiment 2 of the present invention.

Differences between Embodiments 1 and 2 are the configurations of the effective pixel and the dummy pixel. According to Embodiment 1, the selection transistors 105 and 232 are provided. However, according to Embodiment 2, the selection transistors 105 and 232 are not provided. An effective pixel is selected by pulse-driving a pixel power supply.

According to Embodiment 1, the pixel dummy amplification transistors 231 may be provided in plural in one column with a size ratio of the width (W) and the length (L) of the path of the amplification transistor 103 in the effective pixel kept constant. Embodiment 2 is characterized by the following. The width (W) and the length (L) of the path of the pixel dummy amplification transistors 231 of the effective pixels are the same or almost the same as the amplification transistors 103, and the pixel dummy amplification transistors 231 are provided in plural in the same column.

In addition, the number of the pixel dummy amplification transistors 231 is from one to the number of effective pixels connected to the vertical signal line, inclusive. It is favorable that the number of the pixel dummy amplification transistors 231 approximates the number of the effective pixels connected in the same column. Note that since there is actually a layout constraint, it is desirable that a few to tens of the transistors 231 are provided so as to suppress the variations in the characteristics of the transistor caused by the variations in the process.

Subsequently, a description is given of the reason why it is desirable that, in Embodiment 2, the W/L size is the same as the effective pixel and the transistors are increased in the number.

According to Embodiment 1, since the selection transistor 105 in each effective pixel of a non-selected row is OFF, the vertical signal line is not electrically influenced by the amplification transistor 103 in the effective pixel of the non-selected row. However, according to Embodiment 2, since the selection transistor is not provided in the effective pixel, the vertical signal line is electrically influenced by the amplification transistor 103 in the effective pixel in the non-selected row.

More specifically, a low level is applied to the gate of the amplification transistor 103 in the effective pixel in the non-selected row. However, suppose the GND level, 0 V is applied, electric charges are leaked to the photodiode 101 via the transfer transistor 102, which causes the characteristic deterioration, such as white blemish. Therefore, usually a level of approximately 0.1-1 V is applied to the gate of the amplification transistor 103 in the effective pixel in the non-selected row.

In addition, in the status where the black-crush phenomenon does not occur, a high level, $(V_{DD}-V_{SIG})$ is applied to the gate of the amplification transistor 103 in the effective pixel in the selected row, the influence of the amplification transistor 103 in the effective pixel in the non-selected row can be ignored. However, in a status where the black-crush phenomenon occurs, whether the effective pixel is in the selected row or the non-selected row, a low level $(V_{DD}-V_{SIG}-V_{BLACK})$ approximating the GND level is applied to the gate of the amplification transistor 103. Thus, since there is no difference in the gate level of the amplification transistor 103 in the selected row and the non-selected row, the amplification transistor 103 is operated in the same manner in both the selected row and the non-selected row. Herein, the power supply voltage is defined as $V_{DD}$, the signal as $V_{SIG}$, and a voltage drop in the effective pixel separation transistor 220 as $V_{DS}$. In addition, when a voltage drop amount between the gate and the source of amplification transistor 103 in the selected row at the source follower operation is denoted as $V_{TH}$, and when a voltage drop amount between the gate and the source of the amplification transistor 103 in the non-selected row is denoted as $V_{THB}$, the signal level of the node 192 is as follows.

$$V_{DD}-V_{SIG}-(V_{TH}+V_{THB})-V_{DS} \quad \text{(Expression 5)}$$

As described above, in the status where the black-crush phenomenon does not occur, a high level is applied to the amplification transistor 103 in the selected row, and a low level of approximately 0.1-1 V is applied to the amplification transistor 103 in the non-selected row. That is to say, the amplification transistor 103 in the non-selected row is operated in a weak inversion region of the transistor, and the ON resistance of the amplification transistor 103 in the selected row rises very high. Accordingly, $V_{TH} \gg V_{THB}$ holds, and the item of $V_{THB}$ can be ignored.

On the other hand, in the status where the black-crush phenomenon occurs, the level of $(V_{DD}-V_{SIG}-V_{BLACK})$ is applied to the gate of the amplification transistor 103 in the selected row so as to approximate the gate level of the amplification transistor 103 in the non-selected row. In this case, the ON resistance of the amplification transistor 103 in the selected row rises high, and consequently current can pass in the amplification transistor 103 in the non-selected row.

In addition, when current passes the amplification transistor 103 in the non-selected row, the effective pixels connected to the same vertical signal line are connected to hundreds-thousands of the amplification transistors. Thus, a voltage drop $V_{THB}$ between the gate and source of the amplification transistor in the non-selected row becomes dominant. Accordingly, $V_{TH} \ll V_{THB}$ holds.

In conclusion, in a status where the black-crush phenomenon does not occur, the signal level of the node 192 is expressed as follows.

$$V_{DD}-V_{SIG}-V_{TH}-V_{DS} \quad \text{(Expression 6)}$$

In a status where the black-crush phenomenon occurs, the signal level of the node 192 is expressed as follows.

$$V_{DD}-V_{SIG}-V_{THB}-V_{DS} \quad \text{(Expression 7)}$$

As described in Embodiment 1, in order to accurately compare the pixel signal $V_{SIG}$ and the bias signal $V_{BIAS}$, it is desirable that the threshold values of $V_{THB}$ and $V_{TH2}$ of the transistor are equal to each other and that $V_{DS}$ and $V_{DS2}$ are equal to each other. More specifically, it is desirable that the type of the transistor is common between (i) the pixel dummy amplification transistor 231 and the amplification transistor 103 of each of all the effective pixels, and (ii) the dummy pixel separation transistor 233 and the effective pixel separation transistor 220. The common transistor herein means that the transistors have the same processing flow, and have the same ion species, for example.

On the other hand, the difference from Embodiment 1 is that with regard to the amplification transistor 103 in the effective pixel, a plurality of pixel dummy amplification transistors 231 are connected in parallel.

More specifically, a size of the width (W) and the length (L) of the path of the pixel dummy amplification transistor 231 is identical with that of the amplification transistor 103 in the effective pixel, and the number of transistors approximates the number of the transistors in the effective pixel in the same column. With this configuration, $V_{THB}$ and $V_{TH2}$ can be identical with each other, and $V_{DS}$ and $V_{DS2}$ can be identical with each other.

In addition, the number of the pixel dummy amplification transistors 231 is from one to the number corresponding to the number of the effective pixels connected to the vertical signal line, inclusive. It is desirable that the number of the pixel dummy amplification transistors 231 approximates the number of the effective pixels. However, actually, there is a layout constraint, it is desirable that the pixel dummy amplification transistors 231 are provided in the number necessary for suppressing the variations in the characteristic of the transistors caused by the variations in the process.

When the number of the pixel dummy amplification transistors 231 is insufficient, $V_{THB}$ and $V_{TH2}$ are not exactly the same. Note that, however, by adding a potential difference $\Delta V_{THB}$ corresponding to the potential difference to $V_{BIAS}$, the black-crush judgment can be performed.

More specifically, it is desirable that $V_{BIAS}$ is set to fall within a range of $V_{SAT}+\Delta V_{THA}<V_{BIAS}<V_{SAT}+V_{BLACK}-\Delta V_{THB}$. $\Delta LV_{THA}$ is a value corresponding to a difference between $V_{TH}$ and $V_{TH2}$ in a status where the black-crush phenomenon does not occur, and can be expressed by $\Delta V_{THA}=V_{TH2}-V_{TH}$.

In addition, $\Delta V_{THA}$ and $\Delta LV_{THE}$ are obtained by detecting a difference between source follower circuit output configured by the effective pixels and source follower circuit output configured by the dummy amplification transistors, the $\Delta V_{THA}$ and $\Delta V_{THB}$ may be sent to the bias circuit 123 as feedback. In addition, in a simplified manner, maximum values of $\Delta V_{THA}$ and $\Delta V_{THB}$ expected from the variations in the process are estimated, and $V_{BIAS}$ is set as a fixed value, and the circuit may be downsized.

Thus, the solid-state imaging device pertaining to the present invention is described based on the embodiments. However, the present invention is not limited to these embodiments and the following modifications can be made, for example.

(1) According to Embodiment 1, the selection transistor 105 is provided in the effective pixel, and the pixel dummy selection transistor 232 is provided in the dummy pixel. However, the present invention is not limited to this. For example, the selection transistor 105 is provided in the effective pixel, whereas the pixel dummy selection transistor 232 is not provided in the dummy pixel. This is because the voltage drop $V_{DS}$ in the pixel dummy selection transistor 232 is smaller than the voltage drop $V_{TH}$ of the pixel dummy amplification transistor 231, which has a small impact on the accuracy of the black-crush judgment. Thanks to the omission of the pixel dummy selection transistor 232, the pixel dummy amplification transistor 231 can take up more space.

(2) According to the embodiments, although the effective pixel separation transistor 220 and the dummy pixel separation transistor 233 are provided, the effective pixel separation transistor 220 is not always necessary. Note that in order to reduce a black-crush judging period and attenuate the impact of output from the effective pixel during the black-crush judging period, as with the embodiments, it is advantageous to provide the effective pixel separation transistor 220.

Figure 10:
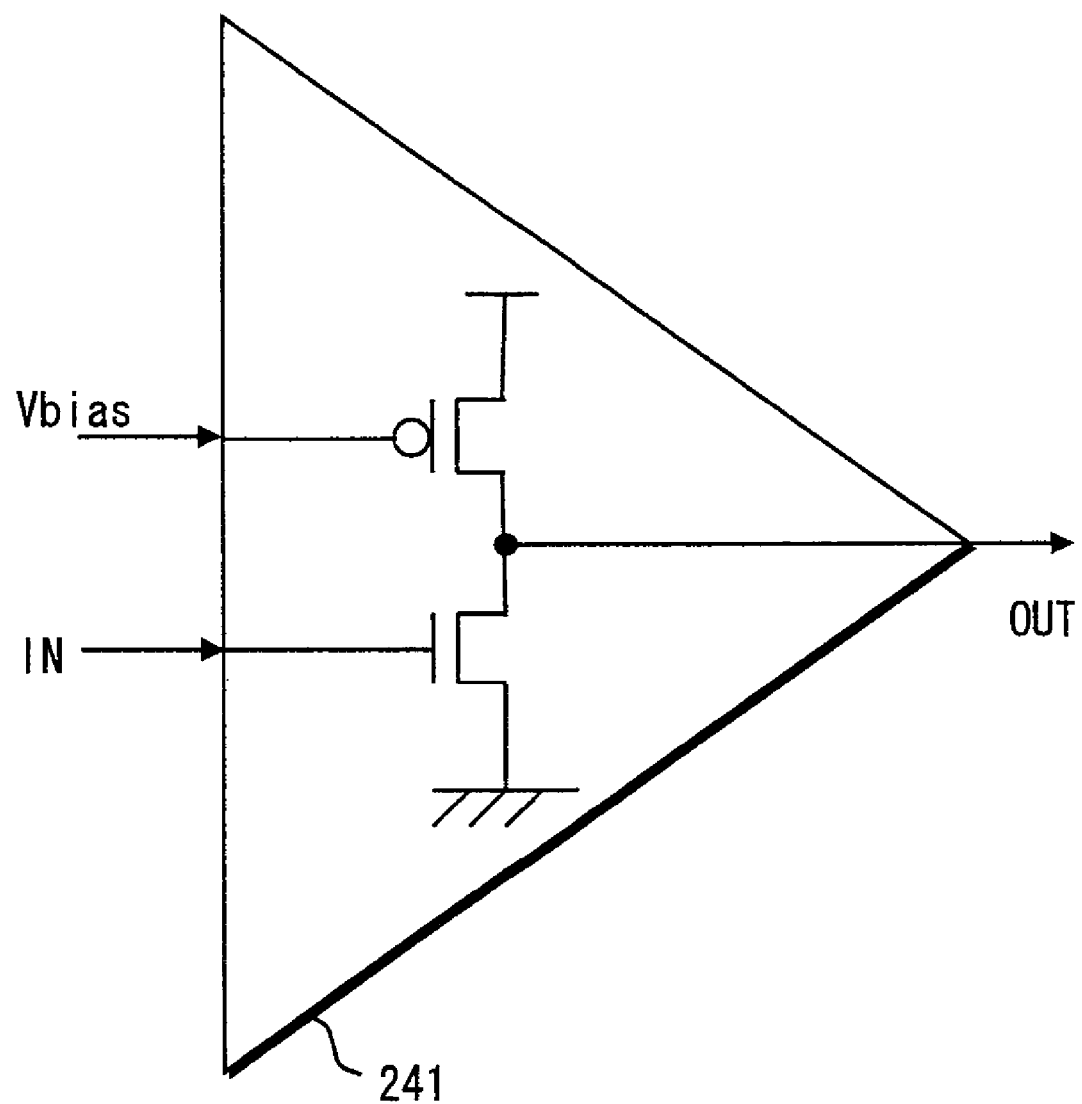
FIG. 10 is a circuit diagram showing an example of a configuration of an inverting amplifier.

(3) According to the embodiments, although the configuration of the inverting amplifier 241 is not clearly described, any configuration is applicable to the inverting amplifier 241. For example, as shown in FIG. 10, a configuration having the simplest source-grounded amplifier is applicable. Note that, in general, a cascode is provided therein to enhance the gain. In addition, the configuration of the differential amplifier is applicable thereto.

(4) According to the embodiments, although the read-out unit 240 supporting both the signal amplifying function and the black-crush judgment function is employed in the circuit configuration, the read-out unit 240 does not need to have such a circuit configuration. For example, if the signal amplifying function is unnecessary, the read-out unit 240 may include an amp without the feedback capacitor 243, or may include a comparison circuit using a differential amplifier, for example. As long as the read-out unit 240 sequentially compares the pixel signal and the black-crush judgment generation signal, the read-out unit 240 is not limited to the circuit configuration described in the embodiments.

(5) According to the embodiments, the description is given that the output circuit 200 includes the analog front end, the A/D convertor (ADC), the output processing unit and the like. However, when the A/D convertor is not built therein, the output circuit 200 may include solely the output processing unit having an analog amp. In addition, as shown in FIG. 7, the output circuit 200 may be configured to perform digital output.

(6) The following describes a configuration of an imaging device as another application of the solid-state imaging device. The imaging device is, specifically, a module having the solid-state imaging device, a digital signal processing unit, an optical system collectively packaged therein, and a camera, a mobile phone and the like having the module. In this Specification, a configuration having solely the CMOS image sensor function is referred to as the solid-state imaging device, and a integrated configuration of the solid-state imaging device and other elements (control circuit, operation unit, display unit, and data accumulation function, communication function and the like) is referred to as the imaging device.

Figure 11:
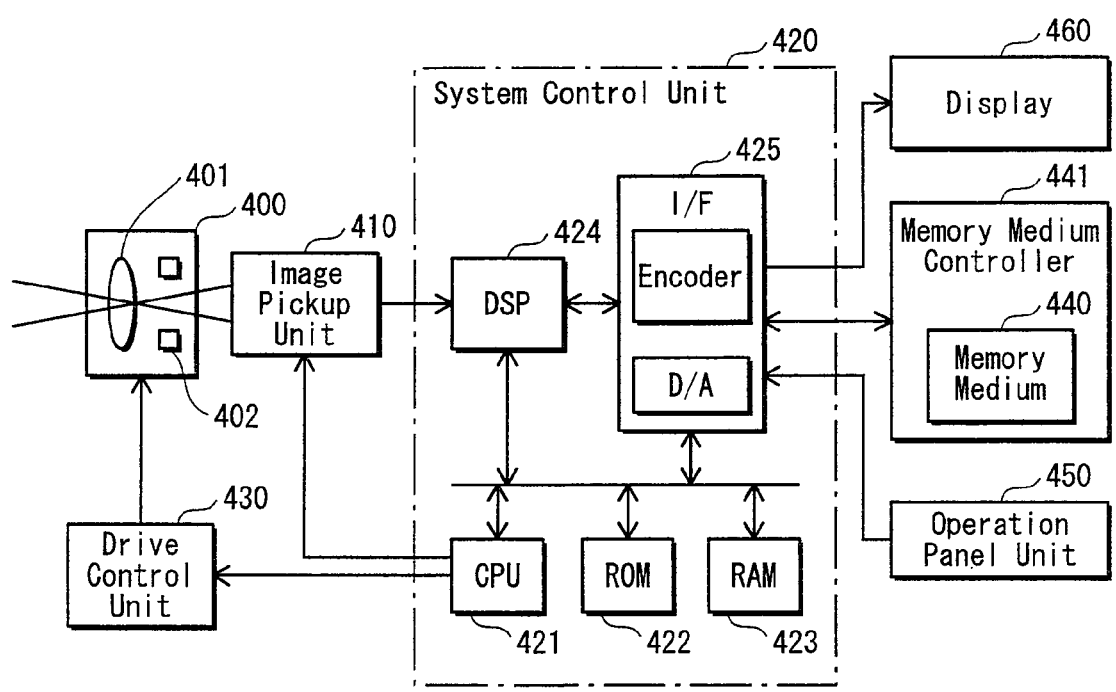
FIG. 11 is a block diagram showing a camera pertaining to the present invention.

FIG. 11 is a block diagram showing a configuration of the camera.

In FIG. 11, an image pickup unit 410 is, for example, the solid-state imaging device shown in the above embodiments. The image pickup unit 410 outputs an image-pickup signal to a system control unit 420 disposed on a main substrate thereof. That is to say, according to the image pickup unit 410, on the output signal of the aforementioned CMOS image sensor, processing, such as AGC (automation gain control), OB (optical black) clamp, CDS (correlated double sampling), and AD conversion is performed, and video data that is a digital signal is generated and outputted.

The optical system 400 includes a zoom lens 401, a diaphragm mechanism 402 or the like disposed inside a lens tube thereof. The optical system 400 provides a subject image for an image pickup unit of the CMOS image sensor. Based on an instruction from a system control unit 420, a drive control unit 430 performs control, such as autofocus, by mechanically controlling each unit.

The system control unit 420 is provided with a CPU 421, a ROM 422, a RAM 423, a DSP 424, an external interface 425 and the like.

The CPU 421 controls the entire system by transmitting an instruction to each unit of the camera with the use of the ROM 422 and the RAM 423.

The DSP 424 generates video data (e.g. YUV signal or the like) of still images or moving images in a predefined format by performing various types of signal processing on the video data outputted by the image pickup unit 410.

The external interface 425 is provided with various types of encoders and D/A convertors, and communicate various types of control signals and data with external elements (in this example, a display 460, a memory medium 440, an operation panel unit 450) connected to the system control unit 420.

The display 460 is a small-size display device, such as a liquid crystal panel built in a camera, and displays a picked-up image. Note that in addition to such a small-size display device built in a camera device, the display 460 may be a large-size display device to which video data is transmitted and which can display the video data.

The memory medium 440 can appropriately store shot images, such as various types of memory cards. The memory medium 440 has memory medium exchangeable with, for example, a memory medium controller 441. As the memory medium 440, in addition to the various types of memory cards, a disc medium or the like using magnetism or light is also applicable.

The operation panel unit 450 is provided with input keys for a user to give various types of instructions in shooting images with a camera. The CPU 421 monitors input signals from this operation panel unit 450, and performs various types of operation control based on the input.

By applying the solid-state imaging device of the embodiment suppressing longitudinal noises and performing the black-crush correction to such a camera, a high-image quality, small-size and low cost camera can be realized. Note that, with the above configuration, combinations of unit devices and unit modules that are configuration elements of the system, and a size of the set can be suitably selected according to an actual condition of productization and the like, so that the imaging device of the present invention encompasses various modifications.

In addition, according to the solid-state imaging device and the imaging device of the present invention, an image-shot target (subject) is not limited to general video image target, such as figures or landscape. The present invention is applicable to image pickup of special microscopic image patterns detected by a fake bill detector, a fingerprint detector and the like. In such a case, the device configuration of the general camera as shown in FIG. 11 is not applicable, and a more special image pickup optical system and a signal processing system including a pattern analysis need to be included. In this case as well, working effects of the present invention are sufficiently created, and thus accurate images can be detected.

Furthermore, to configure a remote system, such as remote medical care, security surveillance, and personal authentication, a communication module connected to network may be included in the device. Thus, wide applications are feasible.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A solid-state imaging device having a plurality of vertical signal lines, the solid-state imaging device comprising, for each vertical signal line:
   an effective pixel having a photoelectric converter, a transfer transistor, a reset transistor, and a first amplification transistor, the first amplification transistor being connected to (i) the photoelectric converter via the transfer transistor and a power supply via the reset transistor at a gate thereof, (ii) the power supply at a drain thereof, and (iii) the vertical signal line at a source thereof;
   a dummy pixel having a second amplification transistor being connected to (i) a bias circuit outputting a bias voltage for judging occurrence of a black-crush phenomenon at a gate thereof, (ii) the power supply at a drain thereof, and (iii) the vertical signal line at a source thereof;
   a switch transistor operable to be OFF while a first signal is outputted from the effective pixel and ON while a second signal is outputted from the dummy pixel, the first signal being outputted according to the level of the gate of the first amplification transistor, the second signal being outputted according to the level of the gate of the second amplification transistor, the switch transistor being provided on a path connecting the source of the second amplification transistor and the vertical signal line; and
   a read-out unit operable to (i) read out a level of the first signal while the switch transistor is OFF, and (ii) read out a difference between the level of the first signal and a level of the second signal when the switch transistor is turned from OFF to ON.

2. The solid-state imaging device of claim 1, wherein
   at a first time point while the switch transistor is OFF, the reset transistor is temporarily ON, and at a subsequent second time point while the switch transistor is OFF, the transfer transistor is temporarily ON,
   the read-out unit reads out the level of the first signal by sampling (i) an output level of the effective pixel from the first time point to the second time point and (ii) an output level of the effective pixel from the second time point on, and
   the read-out unit reads out the difference by sampling (i) an output level of the effective pixel while the switch transistor is OFF, and (ii) an output level of the dummy pixel while the switch transistor is ON.

3. The solid-state imaging device of claim 2, wherein
   the read-out unit includes:
   an inverting amplifier circuit connected to the vertical signal line via a clamp capacitor; and
   a switch element connected in series with a feedback capacitor in a feedback path of the inverting amplifier circuit, and
   the switch element is ON while the level of the first signal is read out, and OFF while the difference is read out.

4. The solid-state imaging device of claim 1, further comprising, for each vertical signal line:
   a switch element provided on the vertical signal line between a node connected to the dummy pixel via the switch transistor and a node connected to the effective pixel.

5. The solid-state imaging device of claim 1, wherein
   the first amplification transistor is identical in type with the second amplification transistor.

6. The solid-state imaging device of claim 1, wherein
   the effective pixel further includes a first selection transistor provided on a path connecting the source of the first amplification transistor and the vertical signal line,
   the dummy pixel further includes a second selection transistor provided on a path connecting the source of the second amplification transistor and the vertical signal line, and
   the first selection transistor is identical in type with the second selection transistor.

7. The solid-state imaging device of claim 1, wherein
   the dummy pixel further includes at least one third amplification transistor connected in parallel to the second amplification transistor.

8. solid-state imaging device of claim 1, further comprising, for each vertical signal line:
   a signal retention capacitor retaining therein the level of the first signal read out by the read-out unit while the switch transistor is OFF; and
   a replacement circuit operable to replace the level of the first signal retained in the signal retention capacitor with a prescribed level when the difference shows occurrence of the black-crush phenomenon.

9. The solid-state imaging device of claim 1, further comprising, for each vertical signal line:

a signal retention capacitor retaining therein the level of the first signal read out by the read-out unit while the switch transistor is OFF;

an AD converter circuit operable to perform analog to digital conversion to the level of the first signal retained in the signal retention capacitor;

a memory retaining therein digital information obtained by the AD converter circuit; and a replacement circuit operable to replace the digital information with a prescribed value when the difference shows occurrence of the black-crush phenomenon.

10. The solid-state imaging device of claim 9, wherein the read-out unit reads out the difference during the analog to digital conversion.

11. An imaging device comprising:

a solid-state imaging device operable to image a subject;

an optical system operable to form an image in a pixel area of the solid-state imaging device;

a drive control unit operable to drive the optical system;

a signal processing unit operable to perform signal processing on a signal outputted from the solid-state imaging device and generate video data;

a recording unit operable to record therein the video data;

an output unit operable to output the video data; and an operation unit operable to input various types of input signals for controlling imaging operation, wherein the solid-state imaging device has a plurality of vertical signal lines, the solid-state imaging device comprising, for each vertical signal line:

an effective pixel having a photoelectric converter, a transfer transistor, a reset transistor, and a first amplification transistor, the first amplification transistor being connected to (i) the photoelectric converter via the transfer transistor and a power supply via the reset transistor at a gate thereof, (ii) the power supply at a drain thereof, and (iii) the vertical signal line at a source thereof;

a dummy pixel having a second amplification transistor being connected to (i) a bias circuit outputting a bias voltage for judging occurrence of a black-crush phenomenon at a gate thereof, (ii) the power supply at a drain thereof, and (iii) the vertical signal line at a source thereof;

a switch transistor operable to be OFF while a first signal is outputted from the effective pixel and ON while a second signal is outputted from the dummy pixel, the first signal being outputted according to the level of the gate of the first amplification transistor, the second signal being outputted according to the level of the gate of the second amplification transistor, the switch transistor being provided on a path connecting the source of the second amplification transistor and the vertical signal line; and a read-out unit operable to (i) read out a level of the first signal while the switch transistor is OFF, and (ii) read out a difference between the level of the first signal and a level of the second signal when the switch transistor is turned from OFF to ON.

* * * * *